(12) United States Patent
Newman et al.

(10) Patent No.: US 9,357,250 B1
(45) Date of Patent: May 31, 2016

(54) MULTI-SCREEN VIDEO USER INTERFACE

(71) Applicant: Apple Inc., Cupertino, CA (US)

(72) Inventors: Lucas C. Newman, San Francisco, CA (US); Nicholas J. Paulson, San Francisco, CA (US); Thomas Alsina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/208,099

(22) Filed: Mar. 13, 2014

Related U.S. Application Data

(60) Provisional application No. 61/800,696, filed on Mar. 15, 2013.

(51) Int. Cl.
*H04N 21/258* (2011.01)
*H04N 21/422* (2011.01)
*H04N 21/43* (2011.01)
*H04N 21/482* (2011.01)
*H04N 21/41* (2011.01)

(52) U.S. Cl.
CPC ....... *H04N 21/4126* (2013.01); *H04N 21/4104* (2013.01); *H04N 21/4828* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |

(Continued)

FOREIGN PATENT DOCUMENTS

JP 2000-163031 A 6/2000
JP 2002-342033 A 11/2002

OTHER PUBLICATIONS

Bohn, D. (Jan. 6, 2014). "Rebooting webOS: how LG rethought the smart TV," located at: <http://www.theverge.com/2014/1/6/5279220/rebooting-webos-how-lg-rethought-the-smart-tv>, last visited: Feb. 24, 2014, seven pages.

(Continued)

*Primary Examiner* — Brian T Pendleton
*Assistant Examiner* — Jean D Saint Cyr
(74) *Attorney, Agent, or Firm* — Morrison & Foerster LLP

(57) ABSTRACT

Methods and systems for implementing multi-screen video user interfaces. A handheld device is used to search for content to be displayed on a television. The handheld device presents data according to a first user interface, and while searching for content, any changes to the navigation state of the handheld device are sent to the television. The television receives an update and reformats the data according to a second user interface optimized for displaying the data on the television. The first user interface is native to the handheld device and the second user interface is native to the television. The user of the handheld device is able to utilize a familiar format while searching for content while viewers of the television are able to see the same navigation state as the handheld device but in a familiar format on the television.

20 Claims, 9 Drawing Sheets

(56) References Cited

U.S. PATENT DOCUMENTS

| | | | |
|---|---|---|---|
| 7,663,607 | B2 | 2/2010 | Hotelling et al. |
| 8,479,122 | B2 | 7/2013 | Hotelling et al. |
| 8,495,499 | B1* | 7/2013 | Denise .............. G06F 17/30864 707/706 |
| 2006/0197753 | A1 | 9/2006 | Hotelling |
| 2007/0199035 | A1* | 8/2007 | Schwartz ............... H04N 7/163 725/110 |
| 2012/0042343 | A1* | 2/2012 | Laligand ........ H04N 21/234336 725/53 |
| 2012/0144003 | A1* | 6/2012 | Rosenbaum ........ G06F 17/3082 709/220 |

OTHER PUBLICATIONS

Grey, M. (Jun. 11, 2013). "Comcast's new X2 platform moves your DVR recordings from the box to the cloud," located at: <http://www.engadget.com/2013/06/11/comcast-x2-platform/> last visited: Feb. 24, 2014, fifteen pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

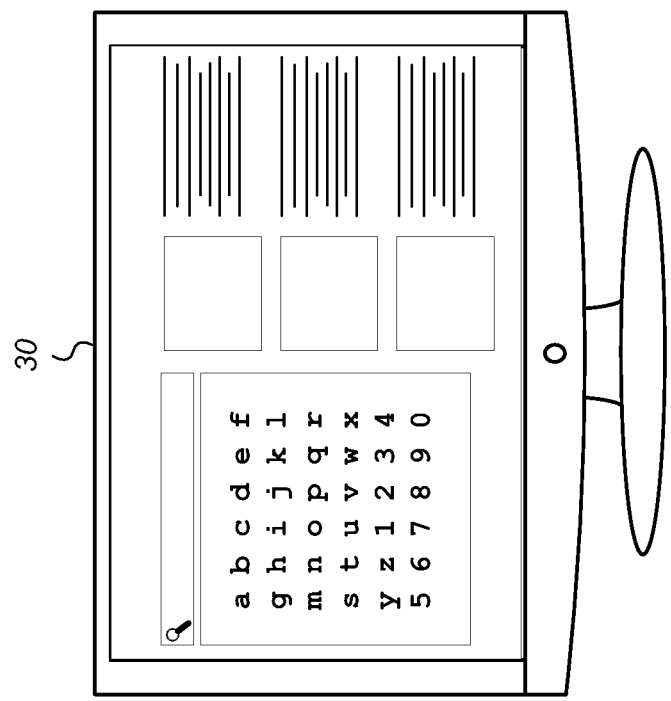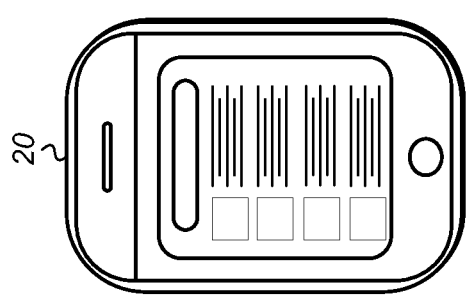
FIG. 4

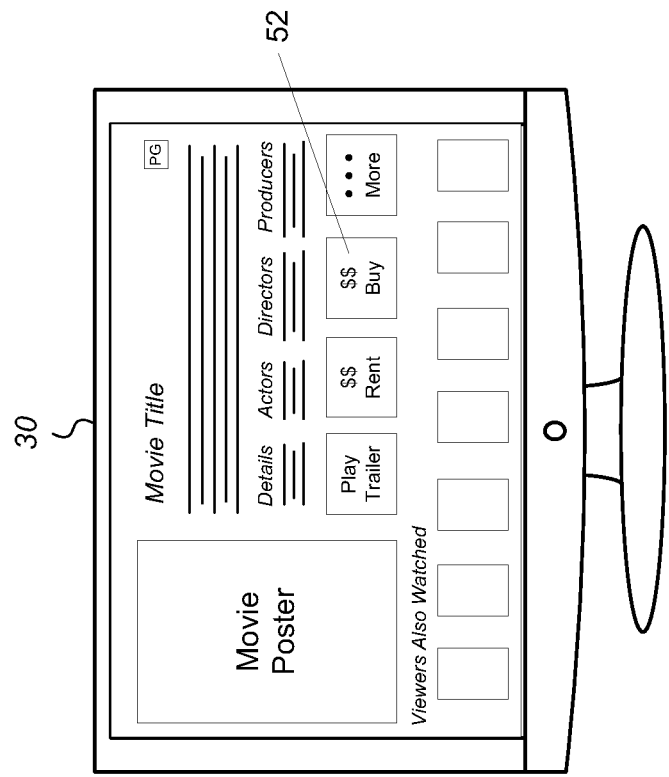
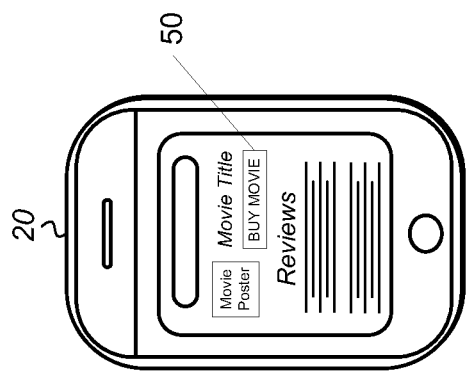
FIG. 6

MULTI-SCREEN VIDEO USER INTERFACE

BACKGROUND

1. Field of the Invention

The present invention relates generally to video displays, and in particular to methods and mechanisms for utilizing multiple display devices in a multimedia content access and management system.

2. Description of the Related Art

A standard entertainment setup in a home includes a television, and often several people may be watching the same show or movie. When viewers are deciding which show to watch, typically a single person will navigate through the television interface searching for content while the other viewers watch the television screen and provide passive assistance to the person navigating. The television typically includes a remote control device, and the remote control device can be used to control the television and interact with the television interface(s) to browse for content and select content for viewing. However, the remote control device can be an awkward and inefficient device to use when searching for content to watch on the television.

As increasing numbers of people are using smartphones, tablets, and other devices, the familiarity with these devices has increased as people use them for searching the Internet and performing a variety of functions that were traditionally performed by a desktop computer. Also, in some cases, devices with a touch screen interface can provide a more efficient and intuitive experience for interacting with display device user interfaces.

Accordingly, new techniques are needed for managing interactions between multiple devices, such as a tablet computer and a television to enhance the user's experience.

SUMMARY

Systems and methods for using multiple display devices together are disclosed.

In one embodiment, a user may use a secondary display device to manage and search for content to display on a primary display device. In one embodiment, the secondary display device is a handheld portable device, such as a smartphone or tablet computer, and the primary device may be a television. The primary device may utilize a first user interface, while the secondary device may utilize a second user interface. The data layout of the first user interface may be different from the data layout of the second user interface, but the navigation states of the first and second user interfaces may be synchronized. In some embodiments, multiple synchronized secondary devices may be utilized within a single system.

In one embodiment, the secondary device may have a touch screen display, and the user may utilize the secondary device to enter text search terms when searching for multimedia content. The input mechanism on the secondary device may include a visual keyboard. When the primary device has a text entry field in focus, the secondary device may automatically present a keyboard to facilitate text entry.

In one embodiment, the secondary device may generate a visual indicator to allow the user to tap to quickly access the remote control features for the primary device from the secondary device's lock screen. This visual indicator may be generated on the secondary device when the secondary device is in the vicinity of the primary device. For example, in one embodiment, a close proximity of the secondary device to the primary device may be detected if both devices are on the same WiFi network, or if the devices are within bluetooth range.

In one embodiment, the synchronization between the primary and secondary devices may be terminated once the chosen content is actively being displayed on the screen of the primary device. Once the synchronization is terminated, the system may transition into a multi-screen experience with the primary screen used to view the chosen content and the secondary screen used for viewing related data, for private browsing, or executing other applications.

In another embodiment, when the software version of the user interface of either the primary or secondary device is out-of-date, the up-to-date device may be used to convey content to the other device(s). The content that is conveyed to the other device may be the missing user interface content, an alternative user interface (i.e., template), updated content, or a black screen.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 illustrates one embodiment of a dual-screen viewing experience of search results.

FIG. 6 illustrates one embodiment of a dual-screen viewing experience displaying movie detail page.

DETAILED DESCRIPTION OF EMBODIMENTS

Figure 1:
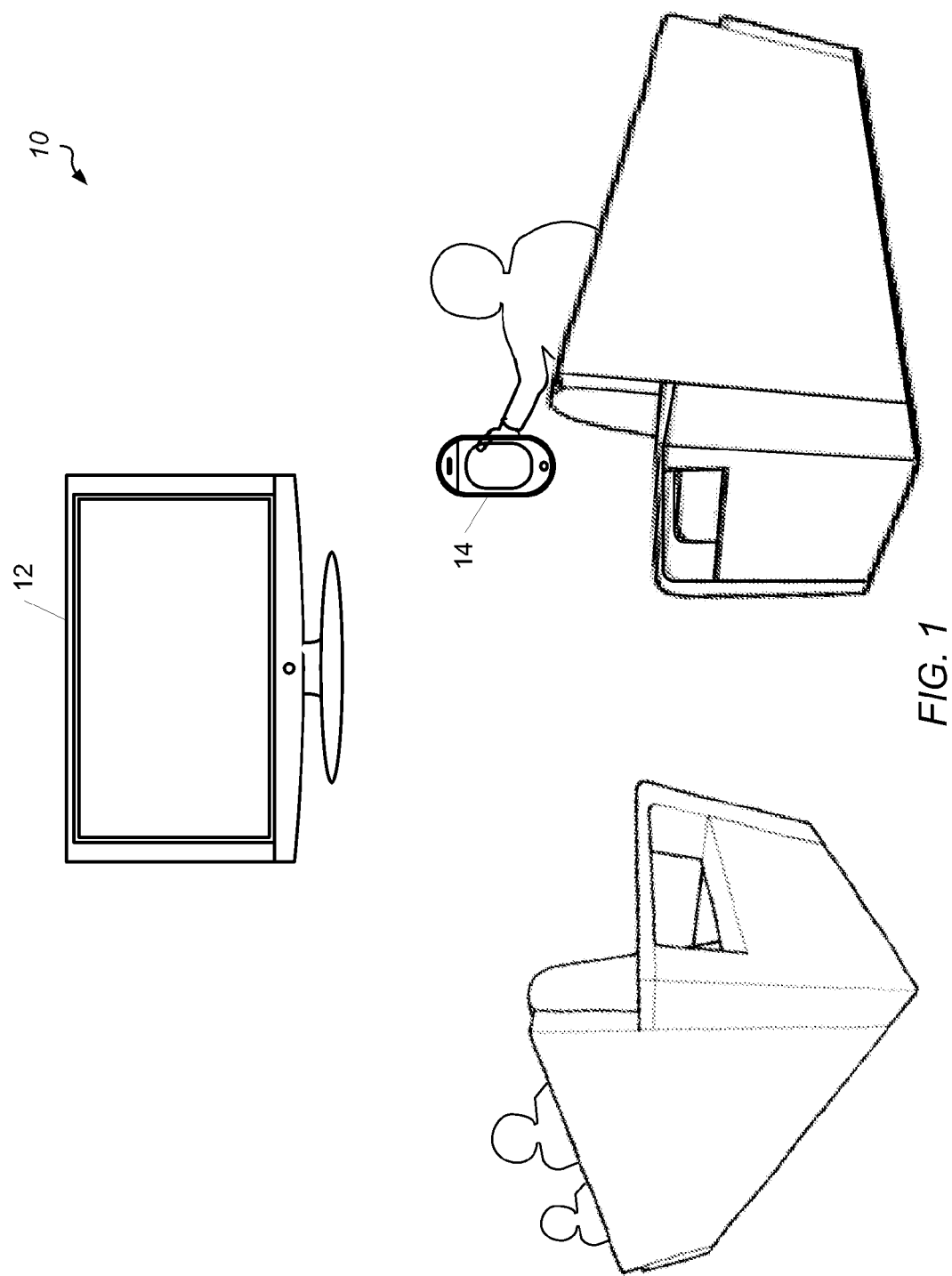
FIG. 1 illustrates one embodiment of a home entertainment system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a primary display . . . ." Such a claim does not foreclose the system from including additional components (e.g., a set top box, a remote, a power supply, a network interface).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a system with a plurality of handheld portable devices, the terms "first" and "second" handheld portable devices can be used to refer to any two of the plurality of handheld portable devices.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a multimedia content access and management system is shown. Such a system may be referred to as a home entertainment system, television system, media content system, or otherwise. However, it is to be understood that such terminology is merely for convenience or purposes of discussion and is not intended to be limiting in any way. For example, the system could be referred to as a television system, even though in a particular scenario television content is not being managed or displayed. Rather, the content in question could be a user's own video, audio content, images, or other content (e.g., stored locally and/or remotely). Similarly, in some scenarios neither display device may be a television.

In the embodiment of FIG. 1, a system 10 including two display devices (12, 14) is depicted. In one embodiment, the first display device is a television 12 and the second display device is a handheld portable device 14. Handheld portable device 14 may have a touch screen display with a graphical user interface (GUI), one or more processors, memory and one or more modules, programs or sets of instructions stored in the memory for performing multiple functions. Handheld portable device 14 may be any type of smartphone, tablet, e-reader, remote control, game console controller, or other device. Also, in some embodiments, handheld portable device 12 may be a larger device not typically considered or referred to as a handheld device, such as a netbook or laptop. In some embodiments, device 14 may not be handheld or portable. As one example, device 14 could be a desktop computer. In one embodiment, television 12 may include hardware and/or software configured to operate with one or more secondary display devices as described herein. Alternatively, television 12 may be coupled to a set-top box which provides such functionality. Consequently, while the term handheld or portable is used herein, it is to be understood that the methods and mechanism described herein are applicable to any device comprising a display. Additionally, references to a "television" may encompass embodiments which include a set-top box and embodiments which do not include a set-top box. For example, in various embodiments a television itself incorporate the hardware and/or software required to support the described functionality. All such embodiments are contemplated.

It is noted that home entertainment system 10 shown in FIG. 1 is merely one example of a home viewing experience. Other systems may include other devices (e.g., surround sound speakers, projection TV, Blu-ray player, DVD player, game console, home media hub, wired or wireless local network connectivity, and so on).

In one particular scenario relating to the experience of system 10, multiple viewers may be attempting to find a TV show, movie, or other entertainment program to watch (or "view"). One of the users (the primary user) may control handheld portable device 14 and utilize handheld portable device 14 for searching for content and browsing through the search results. While the primary user is searching for content on handheld portable device 14, the primary user may only be looking at the screen of the handheld portable device 14. The other users may be looking at television 12. In this scenario, the display shown on handheld portable device 14 may be synchronized with the display of television 12 according to a navigation state, but the layout of data on the screen of device 14 may be optimized for the screen of device 14 and the layout of data on the screen of television 12 may be optimized for the screen of television 12.

In one embodiment, as the primary user is using the interface on handheld portable device 12 to search for content, the other users may be viewing the same general navigation state but in a familiar format native to television 12. This will allow the other users to participate in the decision making process of what to watch. The main subject matter which is displayed on the screen of television 12 may be the same as the main subject matter displayed on the screen of device 14, but the subject matter may be presented in a different manner that is optimized for television 12. In other words, the general layout of data may be similar between device 14 and television 12, but the data layout may be reformatted for whatever is appropriate for the user interface of the respective device. In addition, in some embodiments, device 14 may be used in a vertical (or portrait) orientation while television 12 is fixed in a horizontal (or landscape) orientation. Therefore, in these embodiments, the data which is displayed on device 14 may be formatted and optimized for a vertical orientation, and the data which is displayed on television 12 may be formatted and optimized for a horizontal orientation. Also, in embodiments where there are one or more other devices in addition to device 14, the layout used for each device may be specific to the device.

In one embodiment, the device 14 may include a software program running which is configured to determine what the primary user is looking at on the screen of device 14. Then, when the object of focus on the screen is determined, an indication identifying this object may be sent to television 12 to ensure that the same (or a corresponding) object is also displayed on television 12. Other details and other objects displayed on the screens of device 14 and television 12 may differ, but the main object may appear prominently on both device 14 and television 12. In some embodiments, the main object may appear differently on each device—but they may both map to the same underlying action or object.

In one embodiment, the primary user may enter a text search term into the user interface of device 14 using a keyboard on the touch screen display of device 14. Alternatively, the search term could be entered using handwriting recognition, voice input, or otherwise. When the primary user enters the search term on device 14, the letters the primary user is entering may appear on the device 14 and on television 12, albeit with a slight delay. Then, for example, when the primary user taps enter (or search) for the chosen search term, the results may appear on both device 14 and television 12. The results appearing on television 12 may include additional, auxiliary information that are not shown in the results appearing on device 14, so as to take advantage of the larger screen of television 12. In some embodiments, the results on television 12 may display fewer results than device 14. For example, in one embodiment, device 14 may simply give a list of 20 hits, but television 12 may only be able to display 10 results at a time. Also, the results shown on television 12 may be formatted in a manner to which the viewers are accustomed, in line with the native experience of television 12. For example, a viewer of television 12 may utilize a remote control device associated with television 12 to perform a search for content. This remote may have up and down buttons, right and left buttons, and/or a click wheel, and/or other buttons. When the user uses this remote to search for content by scrolling to individual letters on the screen by moving up and down, right or left, the results are formatted in a specific way for television 12. When the primary user performs a search on device 14, and the corresponding results are shown on television 12 (for the benefit of other viewers), the results may generally look similar to what the user would see if the user had performed the search using a typical remote control associated with television 12.

The communication medium used to communicate between device 14 and television 12 may vary depending on the embodiment. In one embodiment, device 14 may communicate with television 12 using Wi-Fi. In another embodiment, device 14 may communicate with television 12 using bluetooth technology. In further embodiments, device 14 and television 12 may communicate using any other suitable technologies. It is also noted that device 14 is representative of any number of devices which may communicate with television 12, and each of these devices may use any communication medium.

In one embodiment, device 14 and television 12 may both be assigned to the same user and have the same credentials (for accessing subscriptions, purchasing content, storing account information, etc.). In this embodiment, both device 14 and television 12 may browse data natively directly from a content server (local and/or remote) and the data on both device 14 and television 12 may be synchronized. In another embodiment, device 14 and television 12 may have different credentials. For example, if only television 12 has credentials for purchasing or otherwise accessing media content from the content server, and device 14 does not have such credentials, then device 14 may connect to television 12 and receive data from the server through television 12. In this embodiment, television 12 may be driving the content search navigation stack and the content search navigation tree, and device 14 may proxy through television 12 (in whole or in part) and get data through television 12 or the set-top box. This may be the case, if for instance, device 14 is owned by a guest in the house or if device 14 does not have a connection to the internet. Device 14 may be the slave in this case, and television 12 may be the master, and a master-slave communication protocol may be utilized between the two devices. It is also noted that there may be one or more other devices which may also be slave devices in this embodiment. Whichever account is being used on television 12 may be seamlessly transitioned over to device 14, where the state of navigation on television 12 when searching for or managing content is being synchronized to device 14.

Figure 2:
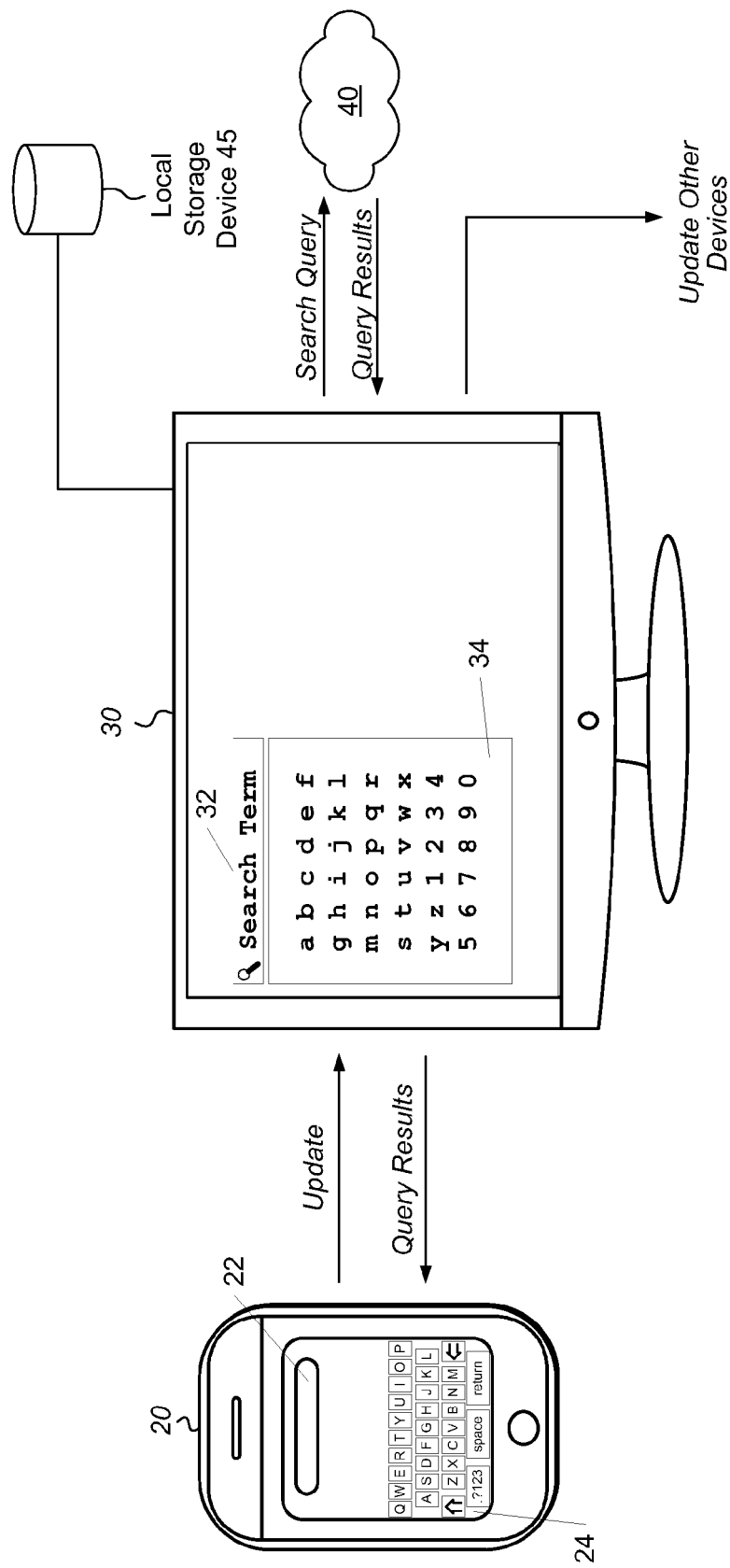
FIG. 2 illustrates one embodiment of a dual-screen viewing experience.

Turning now to FIG. 2, a block diagram of one embodiment of a dual screen viewing experience is shown. Secondary device 20 may be a smartphone, tablet, or other display device. Primary device 30 may be a television, movie or projection screen, computer, or other device with a display used for viewing images, documents, video, or other media content. Primary device 30 may also include a set-top box, although in some embodiments, there may be a separate set-top box coupled to primary device 30. It is noted that primary device 30 may also be referred to as a primary display, and secondary device 20 may be referred to as a secondary display.

The general nature of the data may be synced on the displays of secondary device 20 and primary device 30, but the specific layout of the data may be optimized to the user interfaces of the respective displays. Also, the layout of data may be generated to suit the typical style and formatting to which the users of the devices are accustomed. Therefore, the display of data on secondary device 20 may be synchronized with what is generally displayed on device 20 while the display of content on primary device 30 may appear similar to how data is typically displayed when primary device 30 is used in a standalone mode. In other words, while the content displayed by the devices 20 and 30 may be synced to one another, the content displayed on device 30 may not be a "mirror" of that displayed on device 20.

Figure 3:
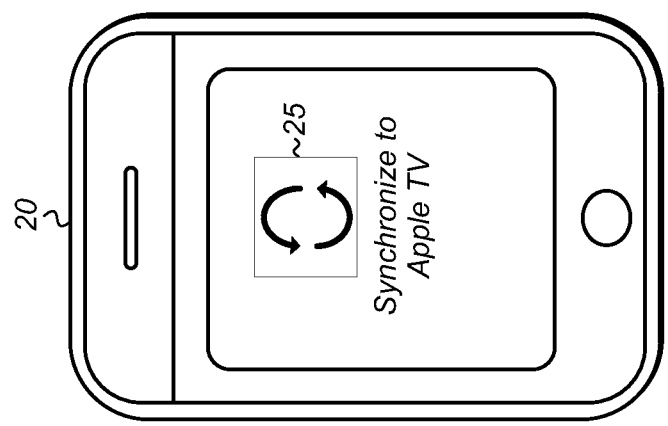
FIG. 3 illustrates one embodiment of an icon on a secondary device for causing a synchronization of navigation states.

In one embodiment, secondary device 20 may have an icon or app to launch the search user interface which allows the user to search for multimedia content to ultimately watch on primary device 30. After launching this application, secondary device 20 may display an icon which when tapped will synchronize the navigation states of device 30 and device 20. FIG. 3 illustrates one embodiment of an icon 25 displayed on secondary device 20 for synchronizing the navigation states of secondary device 20 and primary device 30. Although only a single icon 25 is shown in FIG. 3, it is noted this is for illustrative purposes only, and in other embodiments, icon 25 may be shown as one icon among several rows of icons. Alternatively, if a user enters the search user interface on primary device 30 using a remote, this may trigger the syncing of devices 20 and 30 (or generate a prompt on device 30 and then wait for the user to select this option) and cause the search user interface to be launched on secondary device 20. Other alternative methods for launching the search user interface and causing the syncing of navigation states of devices 20 and 30 are possible and are contemplated.

Once the search user interface is being displayed and devices 20 and 30 are synced, the user may enter a search term on either device. The display of device 20 shown in FIG. 2 is an example of a screen that may be displayed when the user is attempting to search for content to display on primary device 30. The display of device 20 may include a search box 22 as well as an alphabet 24. The user may enter a text search term into search box 22, and then an update may be sent to primary device 30 with the search term. In one embodiment, the update may be sent wirelessly using an interface such as Wi-Fi or Bluetooth. The primary device 30 may receive the search term and the search term may be displayed in search box 32 of the display shown on primary device 30.

As the user is typing the search term, the search term may be sent to the cloud 40, which is representative of the internet and/or a database repository of media content, videos, movies, TV shows, etc. As noted above, searches and accesses may access content stored locally as well (e.g., on a local network, on local storage device 45). In some cases, the context of the search may be understood or otherwise indicated to search only local content, only remote content, or both. Remote content may include dedicated commercial content providers, non-commercial individuals or groups who make content available for access, specific identifiable friends or individuals, or any combination of the above. Additionally, content may be served using a client-server model, peer-to-peer model, or any other model. The results from the search query may be conveyed back to primary device 30, and these results may be displayed in a layout format suitable to the user interface of the display of primary device 30. The query results may also be sent to secondary device 20, and these query results may be displayed in a layout format suitable to the user interface of the display of secondary device 20. It is noted that the query results may also be sent to other remotes affiliated with primary device 30 or with any other secondary devices which may be operating in concert with primary device 30 and secondary device 20.

In some embodiments, when the software version of the user interface of either the primary or secondary device is out-of-date, the up-to-date device may be used to push content to the other device(s). The content that is pushed to the other device may be the missing user interface content, an alternative user interface (i.e., template), or a black screen. The black screen would be responsive to touch and gestures to drive the up-to-date device's user interface.

Referring now to FIG. 4, a block diagram of one embodiment of a dual-screen interface for displaying search results is shown. As shown in FIG. 4, the display of secondary device 20 has been updated to show the search results from the search query entered in FIG. 2. As shown, there are four results shown in the display that were returned from the search query. In one embodiment, each search result item may include a thumbnail image and text which gives a summary and/or other relevant information regarding the corresponding item. If the user scrolls down, then more search results may be displayed. It is noted that the display shown in FIG. 4 is only one example of how search results may be displayed. It is to be understood that other ways of showing search results are possible and are contemplated.

The display of primary device 30 may also show search results from the same search query that was entered in FIG. 2. The search results shown on primary device 30 do not exactly match the search results shown on secondary device 20, but the three search results shown on primary device 30 correspond to those shown on secondary device 20. Additionally, the specific layout format of primary device 30 may show different information for each main search result. It is noted that while the search experience is synced between primary device 30 and secondary device 20, the displays may vary in the actual data displayed. In one embodiment, the user of secondary device 20 may be controlling the search for content, and the user of secondary device 20 may be looking only at the screen of secondary device 20. Other viewers may be watching the screen of primary device 30 and making suggestions to the user of secondary device 20 in regards to how to proceed with the interaction(s).

When the user scrolls down through the search results shown in secondary device 20, discrete changes to the scroll position by the primary user may be sent as an update to the primary device 30. In various embodiments, navigation on device 20 is performed differently from that of device 30. For example, device 20 may permit a swiping motion to scroll results on the screen. However, device 30 may not support such swiping motions and/or may not scroll the screen responsive to such an indication. In one embodiment, to avoid causing discomfort or disorientation to a user of primary device 30, the updates to the scroll position may not be updated continuously but rather in discrete amounts which should make for a more pleasant viewing experience for the passive viewers. Based on the update of the scroll position on secondary device 20 by the primary user, the scroll position of the search results displayed on primary device 30 may be altered to sync to the new view shown on secondary device 20.

In addition to the above, the display of focus (i.e., which items are currently selected) on the display devices 20 and 30 may differ. For example, a focus or cursor on display device 20 may have freedom to move across the screen to selected items. In contrast, the focus or cursor on display device 30 may be limited to a particular location on the screen. In one embodiment, the focus or cursor could move to the bottom of the screen on secondary device 20 to select or highlight the fourth displayed item in the list. In response to this movement of the focus or cursor, a navigation command is conveyed to device 30 to cause it to make the fourth item the subject of its focus. In this example shown, the fourth item is not currently displayed on device 30. Therefore, in response, the list of items displayed on device 30 may scroll or otherwise shift up a position to bring the fourth item into view and the fourth item may then be made the subject of the interface focus. Alternatively, the display 30 may always place items which are the subject of focus in the center of the displayed list. In such a case, the list may be scrolled or otherwise altered to display the fourth item in the center of the result list where it is the subject of focus. In this manner, the display devices are synced—even though the manner of display may be handled quite differently.

Additionally, certain changes to the display of secondary device 20 may not cause changes on primary device 30. For example, if the user of secondary device 20 scrolls to the end of the search results, an elastic stretching (or bounce) may be shown to alert the user that the boundary of the search results has been reached. This bounce may not appear on primary device 30. For example, it may be determined that certain visual depictions on one device are found to be uncomfortable or otherwise undesirable to viewers of a second device. Irrespective of the reason, secondary device 20 may not send an update to primary device 30 for a bounce, or alternatively, secondary device 20 may send an update to primary device 30 to indicate a bounce has been displayed, and primary device 30 may ignore this bounce and keep its display static. Similarly, if the user scales (i.e., zooms in or out) the display of secondary device 20, this scaling may not be displayed on primary device 30. Also, if the user rotates secondary device 20, causing the display to switch the orientation, primary device 30 may prevent this rotation from being displayed.

In another embodiment, when the search results are displayed on both secondary device 20 and primary device 30, a viewer of primary device 30 may wish to see more information regarding a specific result. The viewer may ask the user of secondary device 20 to scroll down to the specific listing, and the user may be able to scroll down to the specific listing on secondary device 30 without having to look up at the primary device 30. In some cases, the specific listing may already be shown on the screen of secondary device 20 and so the user can simply scroll down to the specific listing and tap on it to display more information and actions associated with the specific listing. However, in other cases, the specific listing desired by the viewer may be in the view on primary device 30 but not in the view of secondary device 20 due to the size difference between the screens and fewer results being displayed on secondary device 20. If the user of secondary device 20 does not see the specific listing referred to by the other viewer, the user will only have to scroll down in the results for the specific listing. For example, in one embodiment, five results may be displayed on primary device 30 while four results are shown on secondary device 20. If a viewer wants to see more information regarding the fifth listed result, which is not currently shown on secondary device 20, the user of secondary device 20 may scroll down in the results, causing the results to shift up and the fifth result to appear while the first result is rotated off the screen. Then, with the fifth result displayed, the user will be able to select this fifth result and send an update query to obtain more information regarding this result. When the query results are returned, the additional information regarding the fifth result may be displayed on both secondary device 20 and primary device 30.

In another embodiment, a viewer with a remote control may scroll down on the search results listed on primary device 30. This scrolling may be sent as an update to secondary device 20 (and any other secondary devices) and used to update the appearance of the search results listed on secondary device 20 (and any other secondary devices).

Figure 5:
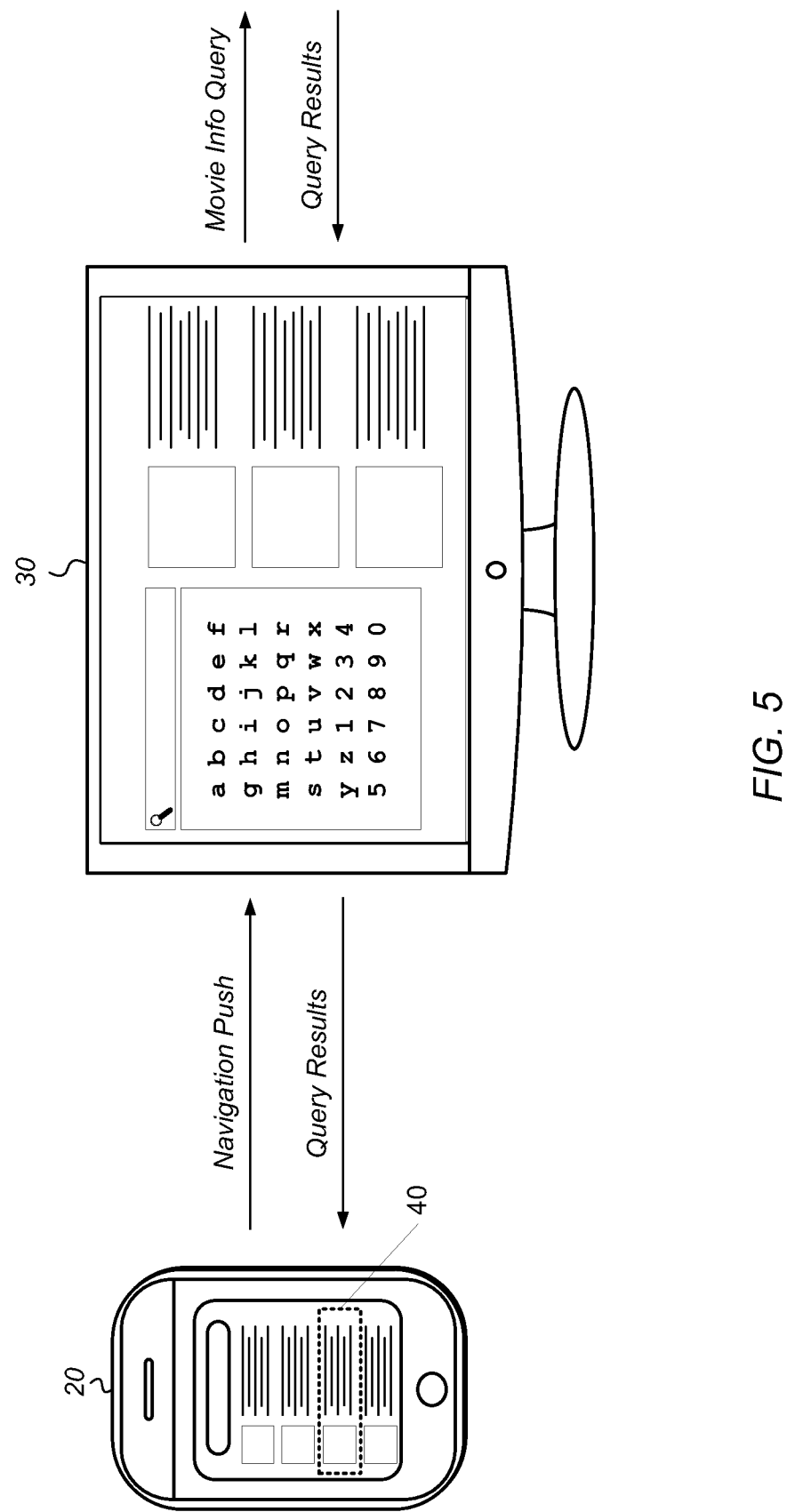
FIG. 5 illustrates one embodiment of a dual-screen viewing experience after selecting a search result.

Turning now to FIG. 5, a block diagram of one embodiment of a dual-screen interface for selecting a search result is shown. As is shown in FIG. 5, the user of secondary device 20 has tapped a movie search result on the screen of secondary device 20. This is indicated with highlighted box 40. It will be assumed for the purposes of this discussion that the user has tapped on the movie within highlighted box 40 with the intention of requesting more details about this movie. As a result, a navigation push command with the configuration data for this search result may be sent to primary device 30. Primary device 30 will receive this navigation push command, and as a result, primary device 30 may send a query for information about this particular movie to a content server (not shown). A first protocol may be used to send the navigation push command from device 20 to device 30, and then device 30 may formulate the appropriate query using a second protocol to communicate with the content server. In one embodiment, the query sent to the content server may not identify or indicate which device generated the query. Alternatively, in another embodiment, the query may identify the original requester (in this case secondary device 20) and specify the type of device (e.g., phone, tablet) and include other relevant information. As a result, the content server may generate a customized response with the query results for the original requester.

In another embodiment, movie information for the movies listed in the search results may be prefetched, and the query to the content server may not need to be sent in this case. Rather, the prefetched movie information could be returned to secondary device 20 and displayed in the appropriate format on secondary device 20.

After the query is sent to the content server, the content server may process the request and return the requested information to primary device 30. As a result, primary device 30 will create a movie detail view from the returned information, and the movie detail view may be optimized for the display of primary device 30. Also, primary device 30 may convey the requested information to secondary device 20, and a different layout may be generated native to secondary device 20 based on the returned information for the selected movie.

Referring now to FIG. 6, another embodiment of a dual-screen interface is shown. FIG. 6 is a continuation of the discussion in FIG. 5. It will be assumed for the purposes of this discussion that a movie has been selected and a request for more movie details has been sent and the requested information has been returned to both secondary device 20 and primary device 30. As a result, the movie details may be shown in a first format familiar to the user of secondary device 20 and a second format familiar to the user(s) of primary device 30.

For example, the display for the selected movie on secondary device 20 may have a buy button 50, in a certain location and with a certain appearance. The buy button 50, as well as the rest of the spatial layout of movie details, may be in a format that is familiar to the user. In one embodiment, the format may be compatible with the ITunes store to which the user of secondary device 20 is familiar. The display for the selected movie on primary device 30 may have a buy button 52 in a different location and with a different appearance. The layout of the display on primary device 30 may be in a format that is familiar to the user. In one embodiment, the format may be compatible with the Apple TV store to which the user(s) of primary device 30 are familiar.

The visual indicator(s) that are generated if the user taps the buy button 50 on secondary device 20 may be different from the visual indicator(s) generated by selecting the buy button 52 on primary device 30. For example, if the user on secondary device 20 were to tap the buy button 50, in order to purchase the movie, then a green confirm indicator may be generated. On primary device 30, when the user taps the buy button 52, an alert may be generated. These visual indicators may be the type of indicators that the respective users are accustomed to seeing on each device. After the buy button is selected on either device, a landing page for the movie (not shown) may be generated on primary device 30 and secondary device 20, and the user can begin playing the movie by either tapping a play button on secondary device 20 or by using the remote control to select the play button on the user interface of primary device 30.

In one embodiment, the display on primary device 30 may hide the reviews of the selected movie. In contrast, the display on secondary device 20 may make the reviews visible on the main screen. If the primary user scrolls to reviews or taps on the reviews on secondary device 20, then an update action may be sent to primary device 30. As a result of receiving this update action, primary device 30 may bring the reviews to the front of the display in a type of show and hide style. Other actions by the primary user which are taken on secondary device 20 which change what is being displayed on secondary device 20 may also cause an update action to be sent to primary device 30. An update action does not cause a change to the navigation state of primary device 30. In contrast, if primary device 30 receives a navigation push or pop from secondary device, this will cause a corresponding change to the navigation state of primary device 30.

Figure 7:
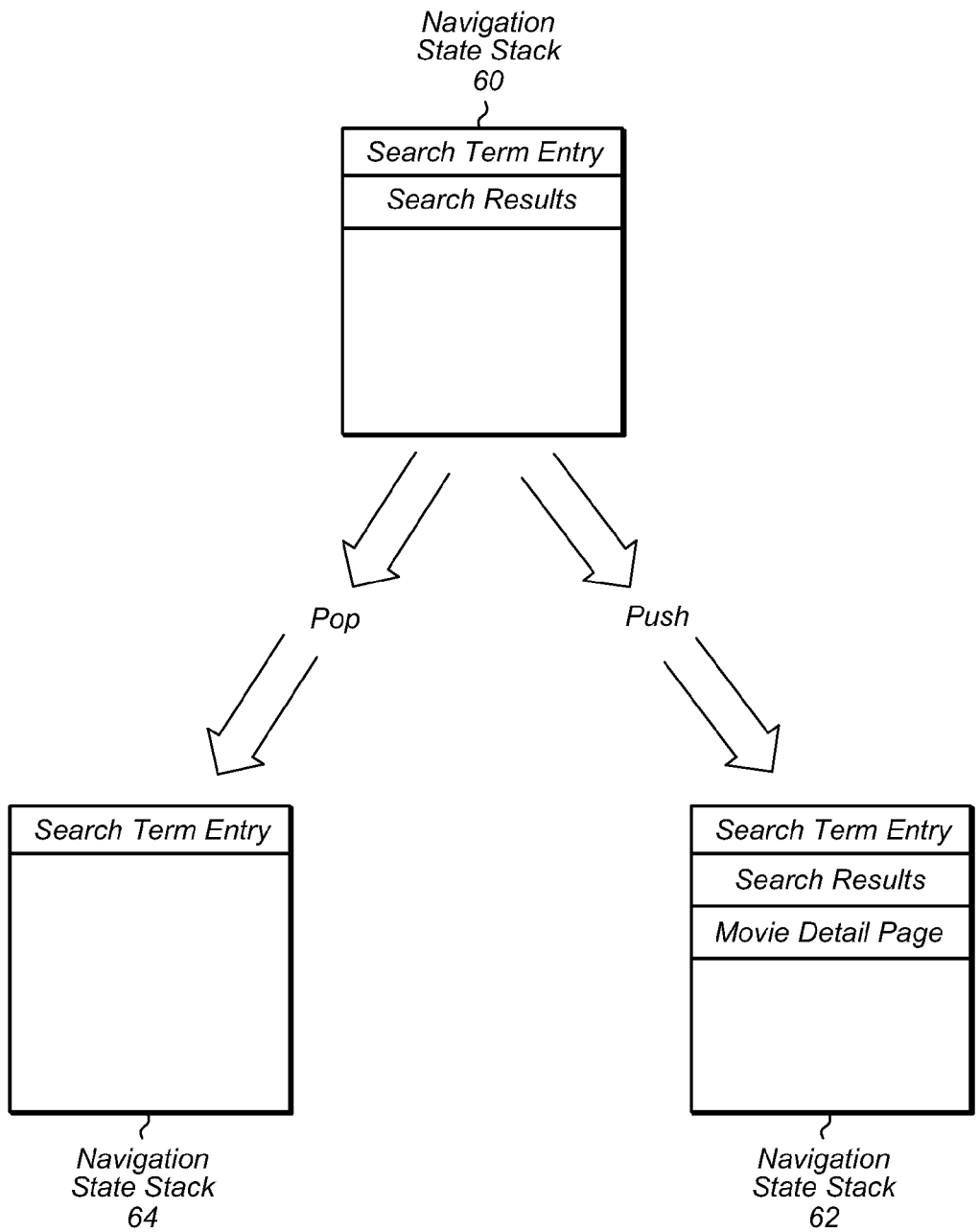
FIG. 7 illustrates one embodiment of a navigation state stack.

Turning now to FIG. 7, one embodiment of a navigation state stack is shown. Navigation state stack 60 may be utilized by a primary device and any number of secondary devices utilized within a multimedia content management and access system (e.g., system 10 of FIG. 1). Each device within the system may have its own stack, and the stack may keep track of the status of the overall navigation tree being traversed during the search for content to watch on a television or other display. In one embodiment, the stack may be stored in the host device's memory and accessed or updated by one or more processors on the host device.

It may be assumed for the purposes of this discussion that navigation state stack 60 is the current stack for a device (primary or secondary). The current navigation state status of stack 60 is displaying search results. For this status, the respective device may be displaying a list of search results based on a previously entered search term. If the user taps on one of the search results to display more information regarding this search result, then a navigation push command will be generated, and navigation state stack 62 represents this scenario. In this scenario, the status of stack 62 will be displaying a movie (or TV show, video game, song, etc.) detail page. The device which generated the navigation push may send the navigation push to all other synchronized devices, which will update the navigation state stacks of these devices.

If a user taps a menu button on a remote or taps the back button on a handheld device, then a navigation pop command may be generated. As a result, the search results state will be popped off of the navigation state stack. Navigation state stack 64 illustrates this scenario. Once the navigation pop command has been generated, this pop may be sent to all other synchronized devices, which will cause the navigation state stacks of these devices to pop off the current state and go back to the previous state. Also, if the user holds down the menu button for a predetermined amount of time, this may cause the navigation state to pop back to the root menu.

Navigations pops and pushes may be sent in a bidirectional fashion in various embodiments. For example, a user of a handheld device may initiate an action which causes a navigation pop or push to be generated, and then this navigation pop or push will be sent to the television and any other handheld devices. Alternatively, a user of a remote may initiate an action on the television interface which causes a navigation pop or push to be generated, and then this navigation pop or push will be sent to all of the synchronized handheld devices.

Figure 8:
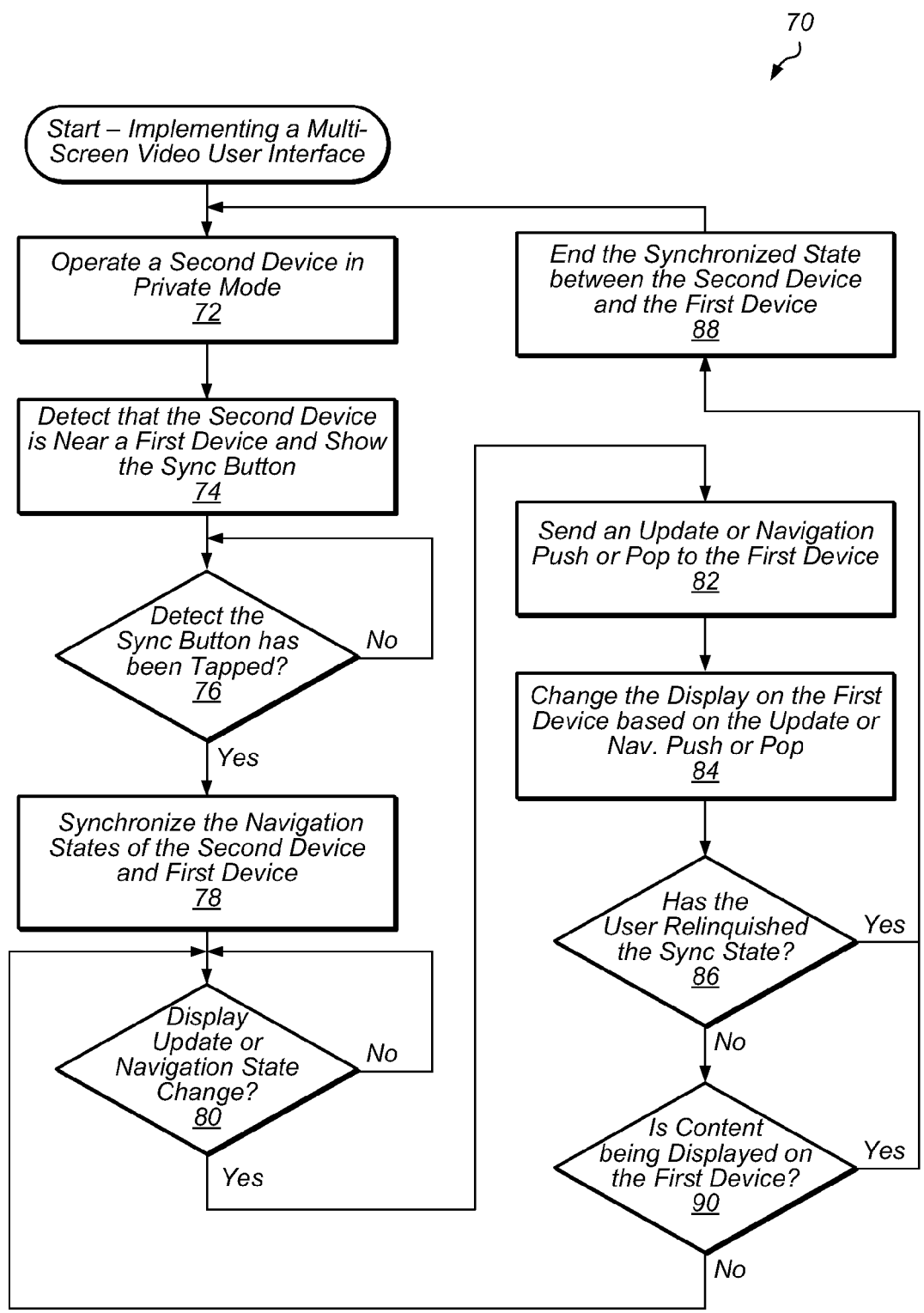
FIG. 8 is a generalized flow diagram illustrating one embodiment of a method for implementing a dual-screen video user interface.

Referring now to FIG. 8, one embodiment of a computer-implemented method 70 for implementing a multi-screen video user interface is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a second device (or handheld portable device) may be operated in private mode (block 72). Private mode is a mode when the user is searching for content or engaged in other activities that do not involve its own display or portions thereof to be synchronized with a television or other display device. It may be assumed for the purposes of this discussion that the handheld portable device is within range of a first device (or television) while being operated in private mode. The television or other display device will be referred to simply as a television for ease of discussion, but it should be understood that other display devices besides televisions may be utilized with method 70. Similarly, it should be understood that the terms "handheld portable device" or "handheld device" refer to any type of electronic device with a display capable of communicating with the television and/or other electronic devices.

The handheld device may detect that it is near a television, and a sync button may be shown on the handheld device (block 74). The sync button may be an app that can be downloaded and run on the handheld device. Alternatively, the sync button may access a service or program this is part of the operating system of the handheld device. In one embodiment, the sync button may appear on the lockout screen as well as in the row of icons/apps in the main pages/screens of the handheld device. In some embodiments, the sync button may also be visible on the screen of the handheld device when performing a search for content for the television, reviewing movie or show details, reading reviews, etc.

If the handheld device detects that the sync button has been tapped (conditional block 76, "yes" leg), then the navigation states of the handheld device and television may be synchronized (block 78). The television may also display data corresponding to the current navigation state, and the data may be displayed in a format suited to the television display. The sync button may also be referred to as a share button. The current navigation state refers to the search process for content, and the stage at which the user is currently in may vary based on user actions. In one embodiment, the user may be in a search page entering a search term when the sync button is tapped. In this case, the current navigation state would be the search page. Any portion of the search term that has already been entered may be an update within the navigation state. If the handheld device does not detect that the sync button has been tapped (conditional block 76, "no" leg), then method 70 may remain at conditional block 76 and the handheld device may remain in private mode.

In some embodiments, the handheld device may be near more than one television. In these embodiments, a list of television devices may be presented on the screen of the handheld device and the user may select which television device to connect and synchronize to. Alternatively, the handheld device may automatically determine which television to synchronize with based on whichever television is closest to the handheld device.

After block 78, the handheld device may determine if the display has been updated and/or if there has been a change to its navigation state (conditional block 80). Updates to the display may be based on the user entering a portion of a search term, the user scrolling up or down within the search results, or other types of changes which cause the display to change. Some updates (specific to handheld devices) to the display (e.g., scaling, rotating, bouncing at a boundary) may not be sent to the television, and so these updates may be ignored. Alternatively, these handheld device specific updates may be sent to the television and the television may determine (based on user configurable settings, in one embodiment) whether to ignore these updates or perform some action in response to the updates. A change to the navigation state may be based on the user tapping on one of the buttons to change the state, tapping the back or menu button, tapping the relinquish button, or taking any other action which would cause a change to the navigation state. If the handheld device detects a change to the display or navigation state (conditional block 80, "yes" leg), then the handheld device may send an update or navigation push or pop to the television (block 82). If the handheld device does not detect a change to the display (conditional block 80, "no" leg), then method 70 may remain at conditional block 80 until a change is detected.

After block 82, as a result of receiving the update or navigation push from the handheld device, the television may change its display based on the specific details associated with the received update or navigation push or pop (block 84). After the television updates its display, the display layout of the television may not precisely match the display layout of the handheld device, but the navigation state and the center of focus may be synced on both displays. Next, the handheld device may determine if the user has relinquished the synchronized state between the handheld device and the television (conditional block 86). In one embodiment, the handheld device may display a relinquish button somewhere on the screen for each navigation state when the user is searching for content to display on the television. Alternatively, the handheld device may show the relinquish button on a menu page. In other embodiments, other ways of switching out of the synchronized state between the handheld device and television may be utilized.

If the handheld device detects that the relinquish button has been tapped (conditional block 86, "yes" leg), then the handheld device may terminate the synchronized state with the television (block 88), and then method 70 may return to block 72 and the handheld device may go back into private mode. If the handheld device does not detect that the relinquish button has been tapped (conditional block 86, "no" leg), then the handheld device may determine if media content has been selected and is actively being displayed on the television (conditional block 90). The handheld device may determine that content (e.g., movie, show, song, music video, video game, document, image, slide show) is actively being displayed on the television by querying the television or by receiving a notification from the television when the television starts to actively display content.

If the handheld device determines that content is being displayed on the television (conditional block 90, "yes" leg), then the handheld device may terminate the synchronized state with the television (block 88), and then method 70 may return to block 72 to browse in private mode. Alternatively, in another embodiment, when content is being displayed on the television, the handheld device may present a specialized user interface to control playback or display content-related information. If the handheld device determines that content is not being displayed on the television (conditional block 90, "no" leg), then method 70 may return to block 80 to detect if the display has been updated and/or the navigation state has changed.

It is noted that the handheld device may determine that the user has tapped the relinquish button at other points in method 70 other than the step represented by conditional block 86. As a result of detecting that the relinquish button has been tapped (regardless of when this occurs), method 70 may return to block 72 and the handheld device may go back into private mode.

Figure 9:
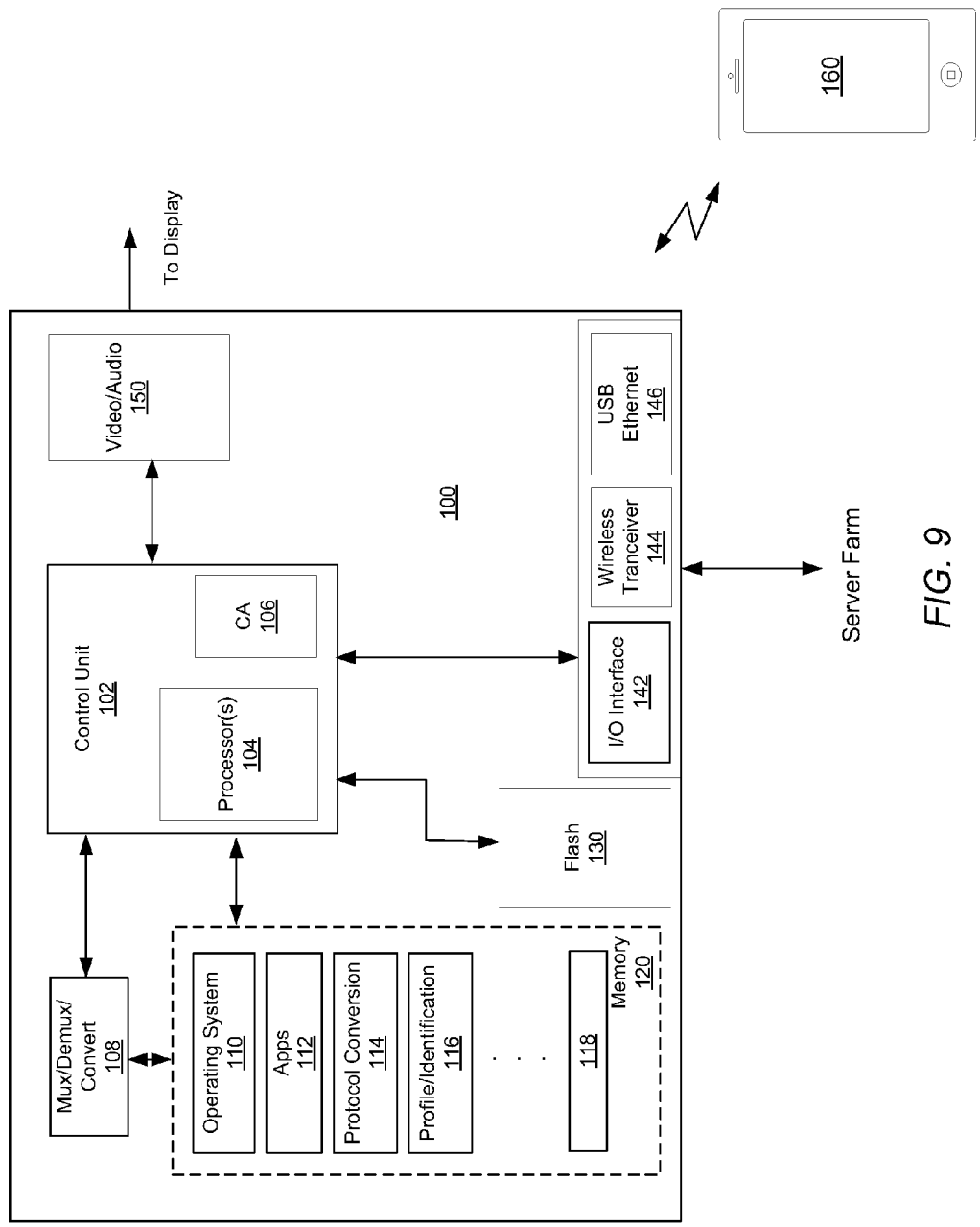
FIG. 9 is a block diagram of one embodiment of a set-top box and a mobile device.

Turning now to FIG. 9, a general block diagram illustrating one embodiment of a set-top box 100 and mobile device 160 is shown. Set-top box 100 is shown to include a control unit 102 including processor(s) 104 and conditional access (CA) type unit 106. Set-top box 100 includes memory 120, persistent memory (Flash) 130, I/O interfaces 142, wireless transceiver 144 configured to support WiFi, Bluetooth, or any other wireless communication protocol, and USB and Ethernet interfaces 146. A mux/demux/convert unit is included which may be configured to receive, demultiplex, and convert the formats of receive signals. A video/audio unit 150 is included to convey audio and video data to a display device. Such audio and video data includes audio/video content received by the set-top box and also includes any overlays or other graphic elements generated by the set-top box 100. Also included are operating system components 110, applications (apps) 112 executable by the processor(s) 104, components 114 for use in converting between communication protocols, viewer profile/identification 116 related components, and any other 118 suitable components. In various embodiments, the set-top box has no tuners in the conventional sense. In other words, the set-top box has no QAM or ATSC tuners. Rather, in various embodiments, the set-top box receives video content via a network interface such as an interface coupled to the Internet.

In various embodiments, set-top box does not include mass storage (such as a disk drive or similar DVR type mass storage device) and is not configured to provide access to locally attached mass storage. Rather, sufficient storage for some video buffering, operating system and application memory resident operations, and so on, may be all that is provided. In such an embodiment, set-top box is generally configured for video streaming and not video storage. Other embodiments could include or provide access to local mass storage. Mobile device 160 may be a dedicated remote control device, smart phone, or other device that is configured to communicate with the set-top box 100. As discussed above, in various embodiments the device 160 may be identifiable as being associated with a subscriber. Responsive to such identification (e.g., using identification component 116 and communication with a subscription service), the set-top box may be authorized to receive subscriber content. In other embodiments, biometric data may be entered to the device 160 (e.g., a fingerprint or voice sample) which is then used for authentication/authorization. Various such embodiments are possible and are contemplated as per the discussion above.

The techniques disclosed herein can be implemented in a variety of ways including, as a system, method, and a computer readable medium. It is noted that the illustrated systems may comprise various forms and types of software. In one embodiment, program instructions and/or a database that represent the described systems, devices, components, and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, nonvolatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

Therefore, according to the above, this disclosure includes subject matter directed to the following examples:

Example 1

A system comprising: a first display; and a second display; wherein the first display is configured to display a first layout of first data; and wherein the second display is configured to display a second layout of the first data, wherein the second layout is different than the first layout.

Example 2

The system as recited in the preceding example, wherein the second layout is generated independently of the first layout, and wherein the second layout is displayed on the second display simultaneously while the first layout is displayed on the first display.

Example 3

The system as recited in any one or more of the preceding examples, further comprising a third display, wherein the third display is configured to display a third layout of the first data, wherein the third layout is the same as the second layout, and wherein the third layout is displayed on the third display simultaneously while the first layout is displayed on the first display.

Example 4

The system as recited in any one or more of the preceding examples, wherein the second layout is a search interface, and wherein contents corresponding to search results in the search interface may be displayed on the first display.

Example 5

The system as recited in any one or more of the preceding examples, wherein the system is configured to synchronize a first navigation state of the first display with a second navigation state of the second display.

Example 6

The system as recited in any one or more of the preceding examples, wherein the circuitry associated with the second display is configured to detect a user action, wherein the user action causes a change in the second navigation state.

Example 7

The system as recited in any one or more of the preceding examples, further comprising a first device comprising the first display and a second device comprising the second display, wherein the second device is configured to send a navigation push to the first device responsive to detecting a change in the second navigation state.

Example 8

The system as recited in any one or more of the preceding examples, wherein the first device is configured to cause a change to the first navigation state to match the change to the second navigation state responsive to receiving the navigation push.

Example 9

The system as recited in any one or more of the preceding examples, wherein the first device is configured to detect a user action that causes a change in the first navigation state.

Example 10

The system as recited in any one or more of the preceding examples, wherein the first device is configured to send a navigation push to the second device responsive to detecting a change in the first navigation state.

Example 11

The system as recited in any one or more of the preceding examples, wherein the second device is configured to cause a change to the second navigation state to match the change to the first navigation state responsive to receiving the navigation push.

Example 12

The system as recited in any one or more of the preceding examples, wherein the first data comprises search results corresponding to a search query.

Example 13

The system as recited in any one or more of the preceding examples, wherein the second display is configured to: detect a scroll gesture scrolling through the search results; and send an update to the first display responsive to detecting the user has scrolled in the search results from a first point to a second point.

Example 14

The system as recited in any one or more of the preceding examples, wherein the second display is configured to: cause the search results to appear to bounce responsive to detecting a user has scrolled to a boundary of the search results, the bounce including displaying an area beyond a terminus of the search results, ceasing to detect the scroll gesture and ceasing to display an area beyond the terminus of the search results; and prevent an update corresponding to the bounce from being sent to the first display responsive to detecting a user has scrolled to a boundary of the search results.

Example 15

The system as recited in any one or more of the preceding examples, wherein the first display is configured to prevent the search results from appearing to bounce responsive to detecting a terminus of the search results being reached.

Example 16

The system as recited in any one or more of the preceding examples, wherein the first device is coupled wirelessly to the second device.

Example 17

The system as recited in any one or more of the preceding examples, further comprising one or more remote devices, wherein the remote devices are configured to control a cursor on the first display.

Example 18

A system comprising: a television; and a handheld device with a display; wherein the system is configured to: utilize the handheld device to search for content to view on the television; and synchronize a first navigation state of the television with a second navigation state of the handheld device.

Example 19

The system as recited in the preceding example, wherein a display of the television is a first size, wherein the display of the handheld device is a second size, and wherein the first size is greater than the second size.

Example 20

The system as recited in any one or more of the preceding examples, wherein the television comprises a set-top box, and wherein the television is configured to translate data and create a first spatial layout for the data on the display of the television, wherein the handheld device is configured to translate data and create a second spatial layout for the data on the display of the handheld device, and wherein the first spatial layout is different than the second spatial layout.

Example 21

The system as recited in any one or more of the preceding examples, wherein the data comprises search results from a query entered on the handheld device for content to view on the television.

Example 22

The system as recited in any one or more of the preceding examples, wherein scrolling from a first search result to a second search result on the handheld device causes an indicator to move from the first search result to the second search result on the television.

Example 23

The system as recited in any one or more of the preceding examples, wherein the handheld device display is a touch screen display.

Example 24

The system as recited in any one or more of the preceding examples, wherein scaling the search results on the display of the handheld device does not cause a corresponding scaling on the search results on the display of the television.

Example 25

The system as recited in any one or more of the preceding examples, wherein rotating the handheld device causes the second spatial layout to rotate but does not cause the first spatial layout on the display of the television to rotate.

Example 26

The system as recited in any one or more of the preceding examples, wherein the television has first credentials, wherein the handheld device has second credentials, and wherein the first credentials are different than the second credentials.

Example 27

A method comprising: receiving first data at a first device; displaying the first data on the first device according to a first layout; receiving the first data at a second device; and displaying the first data on the second device according to a second layout, wherein the second layout is different than the first layout.

Example 28

The method as recited in the preceding example, wherein the first device is a television, wherein the second device is a handheld portable device with a touch screen display, and wherein the first layout is optimized for dimensions of a display on the first device.

Example 29

The method as recited in any one or more of the preceding examples, wherein the first data comprises search results based on a first search query.

Example 30

The method as recited in any one or more of the preceding examples, wherein the first data is received substantially simultaneously at the first device and the second device.

Example 31

A method comprising: synchronizing a first navigation state of a first device to a second navigation state of a second device; and relinquishing the synchronization of the first and second navigation states responsive to detecting a relinquish option has been asserted on the second device.

Example 32

The method as recited in the preceding example, further comprising searching for content to display on the first device.

Example 33

The method as recited in any one or more of the preceding examples, further comprising searching for content to display on the first device using the second device.

Example 34

The method as recited in any one or more of the preceding examples, further comprising sending an update command to the first device from the second device responsive to detecting a change in a display of the second device while the second navigation state does not change.

Example 35

The method as recited in any one or more of the preceding examples, further comprising displaying search results on the first device using a first format.

Example 36

The method as recited in any one or more of the preceding examples, further comprising displaying search results on the second device using a second format, wherein the second format is different than the first format.

Example 37

The method as recited in any one or more of the preceding examples, wherein the first format displays a first number of search results, wherein the second format displays a second number of results, and wherein the first number is greater than the second number.

Example 38

The method as recited in any one or more of the preceding examples, further comprising sending a push command from the second device to the first device responsive to detect a given result has been selected by a user.

Example 39

The method as recited in any one or more of the preceding examples, further comprising generating a pop command on the second device responsive to detecting a user gesture specifying a return to a previous navigation state on the second device.

Example 40

The method as recited in any one or more of the preceding examples, further comprising sending the pop command from the second device to the first device responsive to detecting a user gesture specifying a return to a previous navigation state on the second device.

Example 41

The method as recited in any one or more of the preceding examples, further comprising generating a pop command on the first device responsive to detecting a user gesture specifying a return to a previous navigation state on a remote control device associated with the first device.

Example 42

The method as recited in any one or more of the preceding examples, further comprising sending the pop command from the first device to the second device responsive to detecting a user gesture specifying a return to a previous navigation state on a remote control device associated with the first device.

Example 43

A method comprising: searching for content to view on a first device, wherein the search is performed on a second device; updating a display of the first device responsive to generating a search query; receiving first data corresponding to the search query; generating a first user interface on the first device, wherein the first user interface displays the first data in a first layout; and generating a second user interface on the second device, wherein the second user interface displays the first data in a second layout, wherein the second layout is different than the first layout.

Example 44

The method as recited in the preceding example, wherein the first layout includes one or more portions of the first data not shown in the second layout.

Example 45

The method as recited in any one or more of the preceding examples, wherein a first item is shown as a central item of focus in the second layout, and wherein the first item is shown as a central item of focus in the second layout.

Example 46

The method as recited in any one or more of the preceding examples, further comprising: detecting a scrolling gesture, the scrolling gesture changing a central item of focus in the second layout.

Example 47

The method as recited in any one or more of the preceding examples, further comprising: synchronizing a central item of focus of the second layout with a central item of focus of the first layout.

Example 48

The method as recited in any one or more of the preceding examples, wherein the first layout hides reviews of a given search result in an original view of a detail page associated with the given search result.

Example 49

The method as recited in any one or more of the preceding examples, further comprising sending an update command to the first device from the second device responsive to detecting a first change in the second layout of the second device.

Example 50

The method as recited in any one or more of the preceding examples, wherein the first change is selecting a review section of the given search result.

Example 51

The method as recited in any one or more of the preceding examples, further comprising sending an update command from the second device to the first device responsive to detecting the first change in a display of the second device, wherein the update command includes data identifying the first change.

Example 52

The method as recited in any one or more of the preceding examples, further comprising showing the reviews of the given search result in the first layout on the first device responsive to receiving the update command from the second device.

Example 53

A system comprising: a content server; a television; and a handheld device with a display; wherein the system is configured to: utilize the handheld device to search for content to view on the television; and synchronize a first navigation state of the television with a second navigation state of the handheld device; wherein the television is configured to: receive search queries from the handheld device; forward the search queries to the content server; receive search results from the content server; forward the search results to the handheld device; and display the search results according to a first layout; wherein the handheld device is configured to: forward search queries to the television; receive the search results from the content server via the television; and display the search results according to a second layout indicative of the handheld device, wherein the second layout is different than the first layout.

Example 54

The system as recited in the preceding example, wherein the handheld device is further configured to detect a change in the second navigation state.

Example 55

The system as recited in any one or more of the preceding examples, wherein the change to the second navigation state is caused by a user action.

Example 56

The system as recited in any one or more of the preceding examples, wherein the handheld device is configured to send a navigation push command to the television responsive to detecting the second navigation state has entered a new state.

Example 57

The system as recited in any one or more of the preceding examples, wherein the television is configured to update the first navigation state to the new state responsive to receiving the navigation push command.

Example 58

The system as recited in any one or more of the preceding examples, wherein the handheld device is configured to send a navigation pop command to the television responsive to detecting the second navigation state has entered a previous state.

Example 59

The system as recited in any one or more of the preceding examples, wherein the television is configured to update the first navigation state to the previous state responsive to receiving the navigation pop command.

Example 60

The system as recited in any one or more of the preceding examples, wherein the handheld device is further configured to detect a first update to the display of the handheld device that does not change the second navigation state.

Example 61

The system as recited in any one or more of the preceding examples, wherein the handheld device is further configured to determine if the first update should be sent to the television.

Example 62

The system as recited in any one or more of the preceding examples, wherein the handheld device is further configured to send the first update to the television responsive to determining the first update is a type of update that should be sent to the television.

Example 63

The system as recited in any one or more of the preceding examples, wherein the television is configured to update its display responsive to receiving the first update from the handheld device.

Example 64

The system as recited in any one or more of the preceding examples, wherein the television is configured to keep the first navigation state unchanged responsive to receiving the first update from the handheld device.

Example 65

The system as recited in any one or more of the preceding examples, wherein the handheld device is configured to send the first update to the television responsive to detecting the first update.

Example 66

The system as recited in any one or more of the preceding examples, wherein the television is configured to determine if the first update should cause a corresponding update to its display responsive to receiving the first update.

Example 67

A device with a touch screen display, wherein the device is configured to: receive user input for searching for content to display on a television; synchronize a first navigation state of the device with a second navigation state of the television; send a search query to a content server; receive search results corresponding to the search query; display the search results according to a layout indicative of the device; cause content to be displayed on the television by activating a given search result on the touch screen display; and initiate a private browsing mode responsive to causing content to be displayed on the television.

Example 68

The device as recited in the preceding example, wherein the search query is sent to the content server via the television.

Example 69

The device as recited in any one or more of the preceding examples, wherein the search query is sent to the content server via an internet connection.

Example 70

The device as recited in any one or more of the preceding examples, wherein the device is further configured to send the search results to the television for display on the television.

Example 71

A computer readable storage medium comprising program instructions, wherein when executed the program instructions are operable to: receive first data and generate a first layout of the first data; search for content to view on a first display of a first device; and synchronize a first navigation state of the first device with a second navigation state of a second device.

Example 72

The computer readable storage medium as recited in any one or more of the preceding examples, wherein when executed the program instructions are further operable to detect a user action that causes a change in the first navigation state.

Example 73

The computer readable storage medium as recited in any one or more of the preceding examples, wherein when executed the program instructions are further operable to send a navigation push to the second device responsive to detecting a change in the first navigation state.

Example 74

The computer readable storage medium as recited in any one or more of the preceding examples, wherein when executed the program instructions are further operable to cause a change to the first navigation state to match a change to the second navigation state responsive to receiving a navigation push from the second device.

Example 75

The computer readable storage medium as recited in any one or more of the preceding examples, wherein the first data comprises search results corresponding to a search query.

Example 76

The computer readable storage medium as recited in any one or more of the preceding examples, wherein when executed the program instructions are further operable to: detect a user scrolling through the search results at discrete points; and send an update to the second device responsive to detecting the user has scrolled in the search results from a first discrete point to a second discrete point.

Example 77

The computer readable storage medium as recited in any one or more of the preceding examples, wherein when executed the program instructions are further operable to: cause the search results to appear to bounce responsive to detecting a user has scrolled to a boundary of the search results; and prevent an update corresponding to the bounce from being sent to the second device responsive to detecting a user has scrolled to a boundary of the search results.

Example 78

A computer readable storage medium comprising program instructions, wherein when executed the program instructions are operable to: synchronizing a first navigation state of a first device to a second navigation state of a second device responsive to detecting a user action selecting a synchronization option; and relinquishing the synchronization of the first and second navigation states responsive to detecting a relinquish option has been asserted on the second device.

Example 79

The computer readable storage medium as recited in a the preceding example, wherein when executed the program instructions are further operable to search for content to display on the first device using the second device.

Example 80

The computer readable storage medium as recited in any one or more of the preceding examples, wherein when executed the program instructions are further operable to send an update command to the first device from the second device responsive to detecting a change in a display of the second device while the second navigation state does not change.

Example 81

The computer readable storage medium as recited in any one or more of the preceding examples, wherein when executed the program instructions are further operable to display search results on the second device using a second format, wherein the first device uses a first format, and wherein the second format is different than the first format.

Example 82

The computer readable storage medium as recited in any one or more of the preceding examples, wherein the first format displays a first number of search results, wherein the second format displays a second number of results, and wherein the first number is greater than the second number.

Example 83

The computer readable storage medium as recited in any one or more of the preceding examples, wherein when executed the program instructions are further operable to send a push command from the second device to the first device responsive to detecting a given result has been selected by a user.

Example 84

The computer readable storage medium as recited in any one or more of the preceding examples, wherein when executed the program instructions are further operable to generate a pop command on the second device responsive to detecting a user gesture specifying a return to a previous navigation state on the second device.

Example 85

The computer readable storage medium as recited in any one or more of the preceding examples, wherein when executed the program instructions are further operable to send the pop command from the second device to the first device responsive to detecting a user gesture specifying a return to a previous navigation state on the second device.

Example 86

A computer readable storage medium comprising program instructions, wherein when executed the program instructions are operable to: search for content to view on a first device, wherein the search is performed on a second device; update a display of the first device responsive to generating a search query; receive first data corresponding to the search query; generate a first user interface on the first device, wherein the first user interface displays the first data in a first layout; and generate a second user interface on the second device, wherein the second user interface displays the first data in a second layout, wherein the second layout is different than the first layout.

Example 87

The computer readable storage medium as recited in the preceding example, wherein the first layout includes one or more portions of the first data not shown in the second layout.

Example 88

The computer readable storage medium as recited in any one or more of the preceding examples, wherein a first item is shown as a central item of focus in the second layout, wherein the first item is shown as a central item of focus in the second layout.

Example 89

The computer readable storage medium as recited in any one or more of the preceding examples, wherein when executed the program instructions are further operable to detect a user scrolling and changing a central item of focus in the second layout.

Example 90

The computer readable storage medium as recited in any one or more of the preceding examples, wherein when executed the program instructions are further operable to synchronize a central item of focus of the second layout with a central item of focus of the first layout.

Example 91

The computer readable storage medium as recited in any one or more of the preceding examples, wherein the first layout hides reviews of a given search result in an original view of a detail page associated with the given search result.

Example 92

The computer readable storage medium as recited in any one or more of the preceding examples, wherein when executed the program instructions are further operable to send an update command to the first device from the second device responsive to detecting a first change in a display of the second device.

Example 93

The computer readable storage medium as recited in any one or more of the preceding examples, wherein the first change is selecting a review section of the given search result.

Example 94

The computer readable storage medium as recited in any one or more of the preceding examples, wherein when executed the program instructions are further operable to send an update command from the second device to the first device responsive to detecting the first change in a display of the second device, wherein the update command includes data identifying the first change.

Example 95

The computer readable storage medium as recited in any one or more of the preceding examples, wherein when executed the program instructions are further operable to show the reviews of the given search result in the first layout on the first device responsive to receiving the update command from the second device.

Example 96

A computer readable storage medium comprising program instructions, wherein when executed the program instructions are operable to: receive user input for searching for content to display on a television; synchronize a first navigation state of the device with a second navigation state of the television; send a search query to a content server; receive search results corresponding to the search query; display the search results according to a layout indicative of the device; cause content to be displayed on the television by activating a given search result on the touch screen display; and initiate a private browsing mode responsive to causing content to be displayed on the television.

Example 97

The computer readable storage medium as recited in the preceding example, wherein the search query is sent to the content server via the television.

Example 98

The computer readable storage medium as recited in any one or more of the preceding examples, wherein the search query is sent to the content server via an internet connection.

Example 99

The computer readable storage medium as recited in any one or more of the preceding examples, wherein when executed the program instructions are further operable to send the search results from the device to the television for display on the television.

Example 100

The computer readable storage medium as recited in any one or more of the preceding examples, wherein when executed the program instructions are further operable to detect a change to the first navigation state.

Example 101

The computer readable storage medium as recited in any one or more of the preceding examples, wherein when executed the program instructions are further operable to send a navigation pop command to the television responsive to detecting the first navigation state has returned to a previous state.

Example 102

The computer readable storage medium as recited in any one or more of the preceding examples, wherein when executed the program instructions are further operable to send a navigation push command to the television responsive to detecting the first navigation state has entered a new state.

Example 103

The computer readable storage medium as recited in any one or more of the preceding examples, wherein when executed the program instructions are further operable to update the second navigation state to a previous state responsive to the television receiving the navigation pop command.

Example 104

The computer readable storage medium as recited in any one or more of the preceding examples, wherein when executed the program instructions are further operable to update the second navigation state to a new state responsive to the television receiving the navigation push command.

Example 105

A system comprising: a first device comprising a display; and a second device comprising a display; wherein the first device comprises means to receive first data and generate a first layout of the first data; and wherein the second device comprises means to receive the first data and generate a second layout of the first data, wherein the second layout is different than the first layout.

Example 106

The system as recited in the preceding example, wherein the second layout is generated independently of the first layout, and wherein the second layout is displayed on the second device simultaneously with the first layout being displayed on the first device.

Example 107

The system as recited in any one or more of the preceding examples, further comprising a third device, wherein the third device comprises a display, wherein the third device is configured to receive the first data and generate a third layout of the first data, wherein the third layout is the same as the second layout, and wherein the third layout is displayed on the third device simultaneously with the first layout being displayed on the first device.

Example 108

The system as recited in any one or more of the preceding examples, wherein the second device is configured to search for content to view on the first device.

Example 109

The system as recited in any one or more of the preceding examples, wherein the system is configured to synchronize a first navigation state of the first device with a second navigation state of the second device.

Example 110

The system as recited in any one or more of the preceding examples, wherein the second device is configured to detect a user action that causes a change in the second navigation state.

Example 111

The system as recited in any one or more of the preceding examples, wherein the second device is configured to send a navigation push to the first device responsive to detecting a change in the second navigation state.

Example 112

The system as recited in any one or more of the preceding examples, wherein the first device is configured to cause a change to the first navigation state to match the change to the second navigation state responsive to receiving the navigation push.

Example 113

The system as recited in any one or more of the preceding examples, wherein the first device is configured to detect a user action that causes a change in the first navigation state.

Example 114

The system as recited in any one or more of the preceding examples, wherein the first device is configured to send a navigation push to the second device responsive to detecting a change in the first navigation state.

Example 115

The system as recited in any one or more of the preceding examples, wherein the second device is configured to cause a change to the second navigation state to match the change to the first navigation state responsive to receiving the navigation push.

Example 116

The system as recited in any one or more of the preceding examples, wherein the first data comprises search results corresponding to a search query.

Example 117

The system as recited in any one or more of the preceding examples, wherein the second device is configured to: detect a user scrolling through the search results at discrete points; and send an update to the first device responsive to detecting the user has scrolled in the search results from a first discrete point to a second discrete point.

Example 118

The system as recited in any one or more of the preceding examples, wherein the second device is configured to: cause the search results to appear to bounce responsive to detecting a user has scrolled to a boundary of the search results; and prevent an update corresponding to the bounce from being sent to the first device responsive to detecting a user has scrolled to a boundary of the search results.

Example 119

The system as recited in any one or more of the preceding examples, wherein the first device is configured to prevent the search results from appearing to bounce responsive to detecting a boundary of the search results has been reached.

Example 120

The system as recited in any one or more of the preceding examples, wherein the first device is coupled wirelessly to the second device.

Example 121

The system as recited in any one or more of the preceding examples, further comprising one or more remote devices, wherein the remote devices are configured to control a cursor on the first device.

Example 122

A system comprising: a first device; and a second device comprising a display; wherein the first device comprises means to receive first data and generate a first layout of the first data; and wherein the second device comprises means to receive the first data and generate a second layout of the first data on the display, wherein the second layout is different than the first layout.

Example 123

The system as recited in the preceding example, wherein the second layout is generated independently of the first layout, and wherein the second layout is displayed on the second device simultaneously with the first layout being displayed on a display coupled to the first device.

Example 124

The system as recited in any one or more of the preceding examples, further comprising a third device, wherein the third device comprises a display, wherein the third device is configured to receive the first data and generate a third layout of the first data, wherein the third layout is the same as the second layout, and wherein the third layout is displayed on the third device simultaneously with the first layout being displayed on the display coupled to the first device.

Example 125

The system as recited in any one or more of the preceding examples, wherein the second device is configured to search for content to view on the first device.

Example 126

The system as recited in any one or more of the preceding examples, wherein the system is configured to synchronize a first navigation state of the first device with a second navigation state of the second device.

Example 127

The system as recited in any one or more of the preceding examples, wherein the second device is configured to detect a user action that causes a change in the second navigation state.

Example 128

The system as recited in any one or more of the preceding examples, wherein the second device is configured to send a navigation push to the first device responsive to detecting a change in the second navigation state.

Example 129

The system as recited in any one or more of the preceding examples, wherein the first device is configured to cause a change to the first navigation state to match the change to the second navigation state responsive to receiving the navigation push.

Example 130

The system as recited in any one or more of the preceding examples, wherein the first device is configured to detect a user action that causes a change in the first navigation state.

Example 131

The system as recited in any one or more of the preceding examples, wherein the first device is configured to send a navigation push to the second device responsive to detecting a change in the first navigation state.

Example 132

The system as recited in any one or more of the preceding examples, wherein the second device is configured to cause a change to the second navigation state to match the change to the first navigation state responsive to receiving the navigation push.

Example 133

The system as recited in any one or more of the preceding examples, wherein the first data comprises search results corresponding to a search query.

Example 134

The system as recited in any one or more of the preceding examples, wherein the second device is configured to: detect a user scrolling through the search results at discrete points; and send an update to the first device responsive to detecting the user has scrolled in the search results from a first discrete point to a second discrete point.

Example 135

The system as recited in any one or more of the preceding examples, wherein the second device is configured to: cause the search results to appear to bounce responsive to detecting a user has scrolled to a boundary of the search results; and prevent an update corresponding to the bounce from being sent to the first device responsive to detecting a user has scrolled to a boundary of the search results.

Example 136

The system as recited in any one or more of the preceding examples, wherein the first device is configured to prevent the search results from appearing to bounce responsive to detecting a boundary of the search results has been reached.

Example 137

The system as recited in any one or more of the preceding examples, wherein the first device is coupled wirelessly to the second device.

Example 138

The system as recited in any one or more of the preceding examples, further comprising one or more remote devices, wherein the remote devices are configured to control a cursor on the first device.

Example 139

A system comprising: a first device comprising a television; and a second device comprising a display; wherein the system is configured to: utilize the second device to search for content to view on the first device; synchronize a first navigation state of the first device with a second navigation state of the second device.

Example 140

The system as recited in any the preceding example, wherein a display of the television is a first size, wherein the display of the second device is a second size, and wherein the first size is greater than the second size.

Example 141

The system as recited in any one or more of the preceding examples, wherein the first device comprises a set-top box, and wherein the first device is configured to translate data and create a first spatial layout for the data on the display of the first device, wherein the second device is configured to translate data and create a second spatial layout for the data on the display of the second device, and wherein the first spatial layout is different than the second spatial layout.

Example 142

The system as recited in any one or more of the preceding examples, wherein the data comprises search results from a query entered on the second device for content to view on the first device.

Example 143

The system as recited in any one or more of the preceding examples, wherein scrolling from a first search result to a second search result on the second device causes an indicator to move from the first search result to the second search result on the first device.

Example 144

The system as recited in any one or more of the preceding examples, wherein the second device has a touch screen display.

Example 145

The system as recited in any one or more of the preceding examples, wherein scaling the search results on the display of the second device does not cause a corresponding scaling on the search results on the display of the first device.

Example 146

The system as recited in any one or more of the preceding examples, wherein rotating the second device causes the second spatial layout to rotate but does not cause the first spatial layout on the display of the first device to rotate.

Example 147

The system as recited in any one or more of the preceding examples, wherein the first device has first credentials, wherein the second device has second credentials, and wherein the first credentials are different than the second credentials.

Example 148

A system comprising: a first device comprising a content server; a second device comprising a television; and a third device with a display; wherein the system is configured to: utilize the third device to search for content to view on the second device; and synchronize a first navigation state of the second device with a second navigation state of the third device; wherein the second device is configured to: receive search queries from the third device; forward the search queries to the first device; receive search results from the first device; forward the search results to the third device; and display the search results according to a first layout indicative of the second device; wherein the third device is configured to: forward search queries to the second device; receive the search results from the first device via the second device; and display the search results according to a second layout indicative of the third device, wherein the second layout is different than the first layout.

Example 149

The system as recited in the preceding example, wherein the third device is further configured to detect a change in the second navigation state.

Example 150

The system as recited in any one or more of the preceding examples, wherein the change to the second navigation state is caused by a user action.

Example 151

The system as recited in any one or more of the preceding examples, wherein the third device is configured to send a navigation push command to the second device responsive to detecting the second navigation state has entered a new state.

Example 152

The system as recited in any one or more of the preceding examples, wherein the second device is configured to update the first navigation state to the new state responsive to receiving the navigation push command.

Example 153

The system as recited in any one or more of the preceding examples, wherein the third device is configured to send a navigation pop command to the second device responsive to detecting the second navigation state has entered a previous state.

Example 154

The system as recited in any one or more of the preceding examples, wherein the second device is configured to update the first navigation state to the previous state responsive to receiving the navigation pop command.

Example 155

The system as recited in any one or more of the preceding examples, wherein the third device is further configured to detect a first update to the display of the third device that does not change the second navigation state.

Example 156

The system as recited in any one or more of the preceding examples, wherein the third device is further configured to determine if the first update should be sent to the second device.

Example 157

The system as recited in any one or more of the preceding examples, wherein the third device is further configured to send the first update to the second device responsive to determining the first update is a type of update that should be sent to the second device.

Example 158

The system as recited in any one or more of the preceding examples, wherein the second device is configured to update its display responsive to receiving the first update from the third device.

Example 159

The system as recited in any one or more of the preceding examples, wherein the second device is configured to keep the first navigation state unchanged responsive to receiving the first update from the third device.

Example 160

The system as recited in any one or more of the preceding examples, wherein the third device is configured to send the first update to the second device responsive to detecting the first update.

Example 161

The system as recited in any one or more of the preceding examples, wherein the second device is configured to determine if the first update should cause a corresponding update to its display responsive to receiving the first update.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
generating a first user interface for display on a first device, the first user interface including one or more portions of content, wherein a second device displays a second user interface, the second user interface including one or more portions of the content;
while displaying the first user interface on the first device, receiving an input on the first device; and
in response to receiving the input on the first device:
in accordance with a determination that the input corresponds to a navigational input, the navigational input associated with an animation:
updating a navigational state in the one or more portions of the content in the first user interface in accordance with the navigational input in conjunction with displaying the animation in the first user interface; and
transmitting the updated navigational state to the second device, wherein the second device updates a navigational state in the one or more portions of the content in the second user interface in accordance with the updated navigational state without displaying the animation in the second user interface.

2. The method as recited in claim 1, wherein:
the input comprises a scrolling input for scrolling the one or more portions of the content in the first user interface and the second user interface,
updating the navigational state in the first user interface in conjunction with displaying the animation in the first user interface comprises continuously updating a scroll position in the one or more portions of the content in the first user interface in accordance with the scrolling input, and
updating the navigational state in the second user interface without displaying the animation in the second user interface comprises not continuously updating a scroll position in the one or more portions of the content in the second user interface in accordance with the scrolling input.

3. The method as recited in claim 1, wherein:
the input corresponds to an input to select a first item in the first user interface and the second user interface,
updating the navigational state in the first user interface in conjunction with displaying the animation in the first user interface comprises moving a cursor in the first user interface to the first item in the first user interface in accordance with the input without updating a position of the first item in the first user interface, and
updating the navigational state in the second user interface without displaying the animation in the second user interface comprises moving the first item in the second user interface to a focus location in the second user interface in accordance with the input without updating a position of the focus location in the second user interface.

4. The method as recited in claim 1, wherein:
the input comprises an input to navigate to an end of the content in the first user interface and the second user interface,
updating the navigational state in the first user interface in conjunction with displaying the animation in the first user interface comprises navigating to the end of the content in the first user interface and displaying an elastic stretching animation in the first user interface indicating that the end of the content has been reached, and
updating the navigational state in the second user interface without displaying the animation in the second user interface comprises navigating to the end of the content in the second user interface without displaying the elastic stretching animation in the second user interface.

5. The method as recited in claim 1, wherein:
the input comprises a scaling input,
updating the navigational state in the first user interface in conjunction with displaying the animation in the first user interface comprises scaling the first user interface in accordance with the scaling input, and
updating the navigational state in the second user interface without displaying the animation in the second user interface comprises forgoing scaling the second user interface.

6. The method as recited in claim 1, wherein the one or more portions of the content in the first user interface include one or more reviews, included in the content, of a content item, and the one or more portions of the content in the second user interface do not include the one or more reviews.

7. The method as recited in claim 6, wherein:
the input corresponds to a selection of a given review of the one or more reviews in the first user interface, and
updating the navigational state in the second user interface comprises modifying the second user interface to include at least the given review of the one or more reviews.

8. The method as recited in claim 1, wherein:
the input comprises an orientation adjustment input,
updating the navigational state in the first user interface in conjunction with displaying the animation in the first user interface comprises adjusting an orientation of the first user interface in accordance with the orientation adjustment input, and
updating the navigational state in the second user interface without displaying the animation in the second user interface comprises forgoing adjusting an orientation of the second user interface.

9. A non-transitory computer readable medium comprising program instructions, which when executed by a processor, cause the processor to perform a method comprising:
generating a first user interface for display on a first device, the first user interface including one or more portions of content, wherein a second device displays a second user interface, the second user interface including one or more portions of the content;
while displaying the first user interface on the first device, receiving an input on the first device; and
in response to receiving the input on the first device:
in accordance with a determination that the input corresponds to a navigational input, the navigational input associated with an animation:
updating a navigational state in the one or more portions of the content in the first user interface in accordance with the navigational input in conjunction with displaying the animation in the first user interface; and
transmitting the updated navigational state to the second device, wherein the second device updates a navigational state in the one or more portions of the content in the second user interface in accordance with the updated navigational state without displaying the animation in the second user interface.

10. A first device comprising:
one or more processors;
memory; and
one or more programs, wherein the one or more programs are stored in the memory and include instructions, which when executed by the one or more processors, cause the one or more processors to perform a method comprising:
generating a first user interface for display on the first device, the first user interface including one or more portions of content, wherein a second device displays a second user interface, the second user interface including one or more portions of the content;
while displaying the first user interface on the first device, receiving an input on the first device; and
in response to receiving the input on the first device:
in accordance with a determination that the input corresponds to a navigational input, the navigational input associated with an animation:
updating a navigational state in the one or more portions of the content in the first user interface in accordance with the navigational input in conjunction with displaying the animation in the first user interface; and
transmitting the updated navigational state to the second device, wherein the second device updates a navigational state in the one or more portions of the content in the second user interface in accordance with the updated navigational state without displaying the animation in the second user interface.

11. The non-transitory computer readable medium as recited in claim 9, wherein:
the input comprises a scrolling input for scrolling the one or more portions of the content in the first user interface and the second user interface,
updating the navigational state in the first user interface in conjunction with displaying the animation in the first user interface comprises continuously updating a scroll position in the one or more portions of the content in the first user interface in accordance with the scrolling input, and
updating the navigational state in the second user interface without displaying the animation in the second user interface comprises not continuously updating a scroll position in the one or more portions of the content in the second user interface in accordance with the scrolling input.

12. The non-transitory computer readable medium as recited in claim 9, wherein:
the input corresponds to an input to select a first item in the first user interface and the second user interface,
updating the navigational state in the first user interface in conjunction with displaying the animation in the first user interface comprises moving a cursor in the first user interface to the first item in the first user interface in accordance with the input without updating a position of the first item in the first user interface, and
updating the navigational state in the second user interface without displaying the animation in the second user interface comprises moving the first item in the second user interface to a focus location in the second user interface in accordance with the input without updating a position of the focus location in the second user interface.

13. The non-transitory computer readable medium as recited in claim 9, wherein:
the input comprises an input to navigate to an end of the content in the first user interface and the second user interface,
updating the navigational state in the first user interface in conjunction with displaying the animation in the first user interface comprises navigating to the end of the content in the first user interface and displaying an elastic stretching animation in the first user interface indicating that the end of the content has been reached, and
updating the navigational state in the second user interface without displaying the animation in the second user interface comprises navigating to the end of the content in the second user interface without displaying the elastic stretching animation in the second user interface.

14. The non-transitory computer readable medium as recited in claim 9, wherein:
the input comprises a scaling input,
updating the navigational state in the first user interface in conjunction with displaying the animation in the first user interface comprises scaling the first user interface in accordance with the scaling input, and
updating the navigational state in the second user interface without displaying the animation in the second user interface comprises forgoing scaling the second user interface.

15. The non-transitory computer readable medium as recited in claim 9, wherein:
the input comprises an orientation adjustment input,
updating the navigational state in the first user interface in conjunction with displaying the animation in the first user interface comprises adjusting an orientation of the first user interface in accordance with the orientation adjustment input, and
updating the navigational state in the second user interface without displaying the animation in the second user interface comprises forgoing adjusting an orientation of the second user interface.

16. The first device as recited in claim 10, wherein:
the input comprises a scrolling input for scrolling the one or more portions of the content in the first user interface and the second user interface,
updating the navigational state in the first user interface in conjunction with displaying the animation in the first user interface comprises continuously updating a scroll position in the one or more portions of the content in the first user interface in accordance with the scrolling input, and
updating the navigational state in the second user interface without displaying the animation in the second user interface comprises not continuously updating a scroll position in the one or more portions of the content in the second user interface in accordance with the scrolling input.

17. The first device as recited in claim 10, wherein:
the input corresponds to an input to select a first item in the first user interface and the second user interface,
updating the navigational state in the first user interface in conjunction with displaying the animation in the first user interface comprises moving a cursor in the first user interface to the first item in the first user interface in accordance with the input without updating a position of the first item in the first user interface, and
updating the navigational state in the second user interface without displaying the animation in the second user interface comprises moving the first item in the second user interface to a focus location in the second user interface in accordance with the input without updating a position of the focus location in the second user interface.

18. The first device as recited in claim 10, wherein:
the input comprises an input to navigate to an end of the content in the first user interface and the second user interface,
updating the navigational state in the first user interface in conjunction with displaying the animation in the first user interface comprises navigating to the end of the content in the first user interface and displaying an elastic stretching animation in the first user interface indicating that the end of the content has been reached, and
updating the navigational state in the second user interface without displaying the animation in the second user interface comprises navigating to the end of the content in the second user interface without displaying the elastic stretching animation in the second user interface.

19. The first device as recited in claim 10, wherein:
the input comprises a scaling input,
updating the navigational state in the first user interface in conjunction with displaying the animation in the first user interface comprises scaling the first user interface in accordance with the scaling input, and
updating the navigational state in the second user interface without displaying the animation in the second user interface comprises forgoing scaling the second user interface.

20. The first device as recited in claim 10, wherein:
the input comprises an orientation adjustment input,
updating the navigational state in the first user interface in conjunction with displaying the animation in the first user interface comprises adjusting an orientation of the first user interface in accordance with the orientation adjustment input, and
updating the navigational state in the second user interface without displaying the animation in the second user interface comprises forgoing adjusting an orientation of the second user interface.

\* \* \* \* \*